(12) United States Patent
Cruz-Hernandez et al.

(10) Patent No.: US 8,519,947 B2
(45) Date of Patent: Aug. 27, 2013

(54) CONTROL SCHEMES FOR HAPTIC FEEDBACK INTERFACE DEVICES

(75) Inventors: Juan Manuel Cruz-Hernandez, Montreal (CA); Danny A Grant, Montreal (CA); Alex S Goldenberg, San Francisco, CA (US); Daniel H Gomez, Fremont, CA (US)

(73) Assignee: Immersion Corporation, San Jose, CA (US)

( * ) Notice: Subject to any disclaimer, the term of this patent is extended or adjusted under 35 U.S.C. 154(b) by 1138 days.

(21) Appl. No.: 11/981,227

(22) Filed: Oct. 30, 2007

(65) Prior Publication Data

US 2008/0055244 A1    Mar. 6, 2008

Related U.S. Application Data

(62) Division of application No. 10/895,982, filed on Jul. 22, 2004, now Pat. No. 7,667,687.

(60) Provisional application No. 60/533,129, filed on Dec. 30, 2003.

(51) Int. Cl.
    *G09G 5/00*     (2006.01)

(52) U.S. Cl.
    USPC .......................................................... 345/156

(58) Field of Classification Search
    USPC .................. 345/156, 184, 157; 715/700–702
    See application file for complete search history.

(56) References Cited

U.S. PATENT DOCUMENTS

| | | | |
|---|---|---|---|
| 4,050,265 A | 9/1977 | Drennen et al. |
| 4,131,033 A | 12/1978 | Wright et al. |
| 4,262,240 A | 4/1981 | Arai |
| 4,652,805 A | 3/1987 | Kohn |
| 4,706,294 A | 11/1987 | Ouchida |
| 4,859,922 A | 8/1989 | Tauchenitz et al. |
| 4,891,764 A | 1/1990 | McIntosh |
| 4,943,866 A | 7/1990 | Barker et al. |
| 4,947,097 A | 8/1990 | Tao |
| 5,185,561 A | 2/1993 | Good et al. |
| 5,189,355 A | 2/1993 | Larkins et al. |
| 5,204,600 A | 4/1993 | Kahkoska |
| 5,254,919 A | 10/1993 | Bridges et al. |
| 5,270,689 A | 12/1993 | Hermann |
| 5,298,890 A | 3/1994 | Kanamaru et al. |
| 5,327,790 A | 7/1994 | Levin et al. |
| 5,414,337 A | 5/1995 | Schuler |
| 5,565,887 A | 10/1996 | McCambridge et al. |

(Continued)

OTHER PUBLICATIONS

Kelley, A.J. et al., "On the Development of a Force-Feedback Mouse and Its Integration into a Graphical User Interface," DSC—vol. 55-1, Dynamic Systems and Control, vol. 1, ASME 1994, pp. 287-294.

(Continued)

*Primary Examiner* — Dennis Joseph
(74) *Attorney, Agent, or Firm* — Pillsbury Winthrop Shaw Pittman LLP (57) ABSTRACT

A method is disclosed that includes outputting haptic feedback based on a movement of an object in a first direction from a first position to a second position. The haptic feedback is discontinued when the object is moved in a second direction opposite the first direction subsequent to the movement in the first direction. The haptic feedback is output again when the object moves past the second position in the first direction.

18 Claims, 10 Drawing Sheets

(56) References Cited

U.S. PATENT DOCUMENTS

| | | | |
|---|---|---|---|
| 5,691,898 A | 11/1997 | Rosenberg et al. | |
| 5,731,804 A | 3/1998 | Rosenberg | |
| 5,742,278 A | 4/1998 | Chen et al. | |
| 5,767,839 A | 6/1998 | Rosenberg | |
| 5,808,601 A | 9/1998 | Leah et al. | |
| 5,825,308 A | 10/1998 | Rosenberg | |
| 5,889,670 A | 3/1999 | Schuler et al. | |
| 5,973,670 A | 10/1999 | Barber et al. | |
| 5,973,689 A | 10/1999 | Gallery | |
| 6,020,875 A | 2/2000 | Moore et al. | |
| 6,020,876 A | 2/2000 | Rosenberg et al. | |
| 6,036,495 A | 3/2000 | Marcus et al. | |
| 6,078,308 A | 6/2000 | Rosenberg et al. | |
| 6,084,587 A | 7/2000 | Tarr et al. | |
| 6,088,020 A | 7/2000 | Mor | |
| 6,128,006 A | 10/2000 | Rosenberg et al. | |
| 6,154,201 A * | 11/2000 | Levin et al. | 345/184 |
| 6,166,723 A | 12/2000 | Schena et al. | |
| 6,169,540 B1 | 1/2001 | Rosenberg et al. | |
| 6,219,034 B1 | 4/2001 | Elbing et al. | |
| 6,252,579 B1 | 6/2001 | Rosenberg et al. | |
| 6,252,583 B1 | 6/2001 | Braun et al. | |
| 6,268,671 B1 | 7/2001 | Furuki | |
| 6,283,859 B1 | 9/2001 | Carlson et al. | |
| 6,300,936 B1 | 10/2001 | Braun et al. | |
| 6,420,806 B2 | 7/2002 | Wittig | |
| 6,424,356 B2 | 7/2002 | Chang et al. | |
| 6,456,024 B1 | 9/2002 | Schmider et al. | |
| 6,636,197 B1 | 10/2003 | Goldenberg et al. | |
| 6,639,581 B1 | 10/2003 | Moore et al. | |
| 6,697,748 B1 | 2/2004 | Rosenberg et al. | |
| 6,717,573 B1 | 4/2004 | Shahoian et al. | |
| 6,750,877 B2 | 6/2004 | Rosenberg et al. | |
| 6,854,573 B2 | 2/2005 | Jolly et al. | |
| 6,876,891 B1 | 4/2005 | Schuler et al. | |
| 7,161,580 B2 | 1/2007 | Bailey et al. | |
| 2002/0030663 A1 | 3/2002 | Tierling et al. | |
| 2002/0054019 A1 | 5/2002 | Rosenberg et al. | |
| 2002/0109668 A1 | 8/2002 | Rosenberg et al. | |
| 2002/0126091 A1 | 9/2002 | Rosenberg et al. | |
| 2002/0159336 A1 | 10/2002 | Brown et al. | |
| 2002/0163497 A1 * | 11/2002 | Cunningham et al. | 345/156 |
| 2002/0163498 A1 | 11/2002 | Chang et al. | |
| 2002/0177471 A1 | 11/2002 | Kaaresoja et al. | |
| 2003/0006892 A1 | 1/2003 | Church | |
| 2003/0076298 A1 | 4/2003 | Rosenberg | |
| 2004/0100440 A1 | 5/2004 | Levin et al. | |

OTHER PUBLICATIONS

Minsky, Margaret et al., "Feeling and Seeing: Issues in Force Display," Dept. of Computer Science, 1990, pp. 235-242, 270.

Russo, Massimo Andrea, "The Design and Implementation of a Three Degree of Freedom Force Output Joystick," Dept. of Mechanical Engineering, MIT May 1990, 131 pages.

Russo, Massimo et al., "Controlling Dissipative Magnetic Particle Brakes in Force Reflective Devices," DSC—vol. 42, Advances in Robotics, ASME 1992, pp. 63-70.

Snibbe, Scott S., Haptic Techniques for Media Control, In Proceeding of the 14th Annual ACM Symposium on User Interface Software and Technology, 2001, pp. 1-10.

Stanley, Michael C. et al., "Computer Simulation of Interacting Dynamic Mechanical Systems Using Distributed Memory Parallel Processors," DSC—vol. 42, Advances in Robotics, ASME 1992, pp. 55-61.

Tadros, Alfred Heikal, "Control System Design for a Three Degree of Freedom Virtual Environment Simulator Using Motor/Brake Pair Actuators," Dept. of Mechanical Engineering, MIT Feb. 1990, pp. 2-88.

* cited by examiner

CONTROL SCHEMES FOR HAPTIC FEEDBACK INTERFACE DEVICES

STATEMENT OF RELATED APPLICATION(S)

The present application is a divisional of U.S. patent application Ser. No. 10/895,982, entitled "Hybrid and Resistive Haptic Effects," filed on Jul. 22, 2004 which claims priority to U.S. Patent Application No. 60/533,129, entitled "Hybrid and Resistive Haptic Effects," filed on Dec. 30, 2003.

TECHNICAL FIELD

The present disclosure relates generally to control schemes for haptic feedback interface devices, and more particularly to resistive and hybrid actuator control schemes for haptic feedback interface devices.

BACKGROUND

Haptic feedback interface devices are used for a variety of different functions and are often used with a variety of computer systems. For example, haptic feedback interface devices are used with computer controlled simulations, games, and other application programs. A computer system typically displays a graphical environment to a user on a display screen or other output device. The user can interact with the displayed environment to play a game, experience a simulation or "virtual reality" environment, or otherwise influence events or images depicted on the screen or in an application program or operating system. Such user interaction can be implemented through an interface device, such as a joystick, "joypad" button controller, mouse, trackball, stylus and tablet, foot or hand pedals, control knob, touch panel, etc., that is connected to the computer system. The computer updates the graphical display in response to manipulation of the interface device and provides haptic feedback based on manipulation and/or movement of the object. Examples of such interface devices are disclosed in U.S. application Ser. No. 10/285,450, entitled "Method and Apparatus for Providing Tactile Sensations," which is incorporated herein by reference in its entirety.

The haptic feedback provided by the interface device is often output via actuators in the interface device. These actuators typically include either an active actuator or a resistive actuator, depending upon the desired haptic effect. In addition, interface devices exist that include both resistive and active actuators (i.e., hybrid interface devices). Such interface devices, however, often use the different types of actuators to output feedback that is actuator dependent. In other words, the resistive actuator is used to output one type of feedback and the active actuator is used to output a different type of feedback.

A need exists, however, for improvements in interface devices and control schemes for interface devices that use resistive and active actuators to produce desired haptic effects.

Overview

A method is disclosed that includes outputting haptic feedback based on a movement of an object in a first direction from a first position to a second position. The haptic feedback is discontinued when the object is moved in a second direction opposite the first direction subsequent to the movement in the first direction. The haptic feedback is output again when the object moves past the second position in the first direction.

In other embodiments, a device is disclosed that includes an object displaceable in at least one degree of freedom with respect to a first reference point. A sensor is configured to output a position signal associated with a displacement of the object, the displacement being one of a first displacement, a second displacement and a third displacement. An actuator is configured to output a resistive force based on the position signal, the resistive force being associated with the first displacement of the object in a first direction away from the first reference point until the object is moved to a position. The resistive force is discontinued when the position signal is associated with the second displacement in a second direction opposite the first direction. The resistive force is further output after the third displacement in the first direction past the position, subsequent to the object being moved in the second direction.

DESCRIPTION OF EXAMPLE EMBODIMENTS

Figure 1:
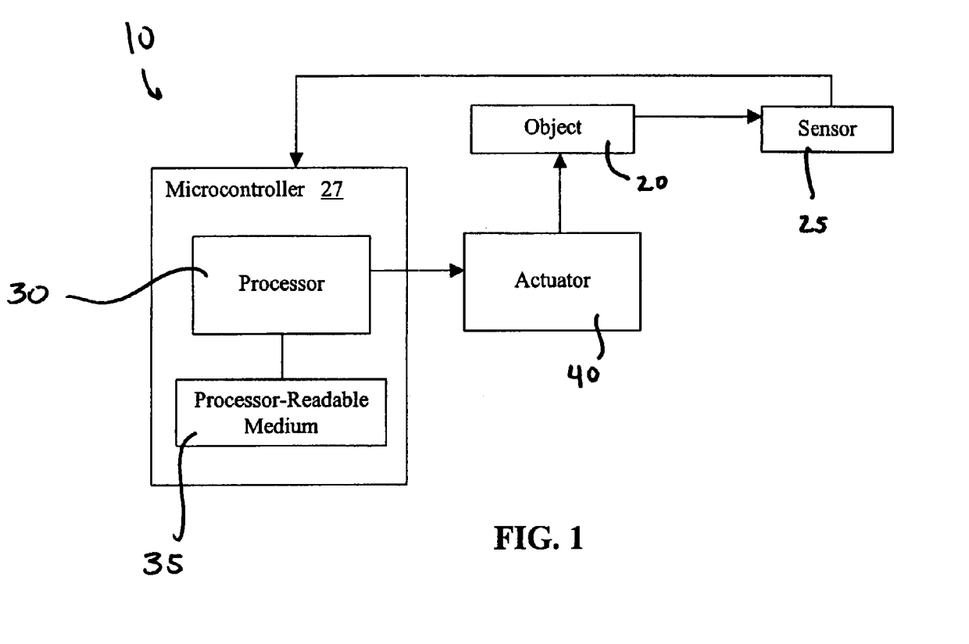
FIG. 1 is a schematic representation of a haptic feedback interface device according to an embodiment.

FIG. 1 is a schematic representation of an interface device 10 according to an embodiment. The interface device 10 includes a manipulandum or an object 20 that is coupled to a sensor 25 and is movable in at least one degree of freedom. The sensor 25 is configured to output sensor signals to a microcontroller 27. The microcontroller 27 outputs signals to an actuator 40 based on at least one of the position, velocity, direction, force, torque and acceleration of the object 20.

In some embodiments, the microcontroller 27 includes a processor 30 having a processor readable medium 35. The processor 30 is configured to receive signals from the sensor 25, and output signals to the actuator 40. The processor 30 can be, for example, a commercially available personal computer, or a less complex computing or processing device that is dedicated to performing one or more specific tasks. For example, the processor 30 can be dedicated to providing an interactive virtual reality environment.

The processor 30, according to one or more embodiments, can be a commercially available microprocessor. Alternatively, the processor 30 can be an application-specific integrated circuit (ASIC) or a combination of ASICs, which are designed to achieve one or more specific functions, or enable one or more specific devices or applications. In yet another embodiment, the processor 30 can be an analog or digital circuit, or a combination of multiple circuits.

In some embodiments, the processor 30 includes the processor readable medium 35. The processor readable medium 35 can include one or more types of memory. For example, the processor readable medium 35 can include a read only memory (ROM) component and a random access memory (RAM) component. The processor readable medium 35 can also include other types of memory that are suitable for storing data in a form retrievable by the processor 30. For example, electronically programmable read only memory (EPROM), erasable electronically programmable read only memory (EEPROM), flash memory, as well as other suitable forms of memory can be included within the processor readable medium 35. The processor 30 can also include a variety of other components, such as for example, co-processors, graphics processors, etc., depending upon the desired functionality of the interface device 10.

The processor 30 is in communication with the processor readable medium 35, and can store data in the processor readable medium 35 or retrieve data previously stored in the processor readable medium 35. The components of the processor 30 can communicate with devices external to the processor 30 by way of an input/output (I/O) component (not shown in FIG. 1). According to one or more embodiments, the I/O component can include a variety of suitable communication interfaces. For example, the I/O component can include, for example, wired connections, such as standard serial ports, parallel ports, universal serial bus (USB) ports, S-video ports, local area network (LAN) ports, small computer system interface (SCSI) ports, and so forth. Additionally, the I/O component can include, for example, wireless connections, such as infrared ports, optical ports, Bluetooth™ wireless ports, wireless LAN ports, or the like.

The processor 30 is configured to receive signals from the sensor 25 and output signals to the actuator 40. The processor 30 receives data values associated with the position, orientation, movement, velocity, acceleration, etc. of the object 20. In alternative embodiments, multiple sensors (not shown) can be used to determine the state of the object 20. In some embodiments, the sensors can detect multiple degrees of freedom of the object (e.g., translation, pitch, yaw, rotation, etc.). Interface device 10 can be implemented such that the object 20 is, for example, a joystick, trackball, mouse, game controller, knob, wheel, button, etc.

Several control schemes are useful to control the output of haptic feedback from the interface device 10 via particular actuator and object configurations. In one embodiment, for example, the object 20 is a knob or wheel and a control scheme is provided to output simulated detent force profiles. Haptic feedback effects for knobs are disclosed in U.S. patent application Ser. No. 10/641,243, entitled "Haptic Feedback Effects for Control Knobs and Other Interface Devices," which is incorporated herein by reference in its entirety.

In one embodiment, control schemes are used in conjunction with a resistive actuator to provide a desired haptic effect. An actuator 40 is provided for each object 20 that includes haptic feedback functionality. In some embodiments, additional actuators can be provided for each degree of freedom of object 20. Actuator 40, can be an active actuator, such as a linear current control motor, stepper motor, pneumatic/hydraulic active actuator, a torque motor (motor with limited angular range), voice coil actuator, etc. Passive actuators can also be used, including magnetic particle brakes, friction brakes, or pneumatic/hydraulic passive actuators, and generate a damping resistance or friction opposite a direction of movement of object 20. Resistive actuators, as discussed herein, include passive actuators. Active actuators, as discussed herein, include assistive actuators.

One implementation of a control scheme includes controlling the haptic feedback based on the velocity of the object 20 (e.g., a knob). In such an implementation, detents output with resistive actuators can have a drawback when moving at high speeds. The simple position-based detent output via resistive actuators provides a sufficiently realistic and acceptable sensation at low speeds. When the object 20 is moved quickly, however, the detents are perceived at a much lower magnitude. One way to compensate for this effect is to make the magnitude of the detents a function of the velocity. As the velocity increases, so does the peak torque of the detents.

Figure 2:
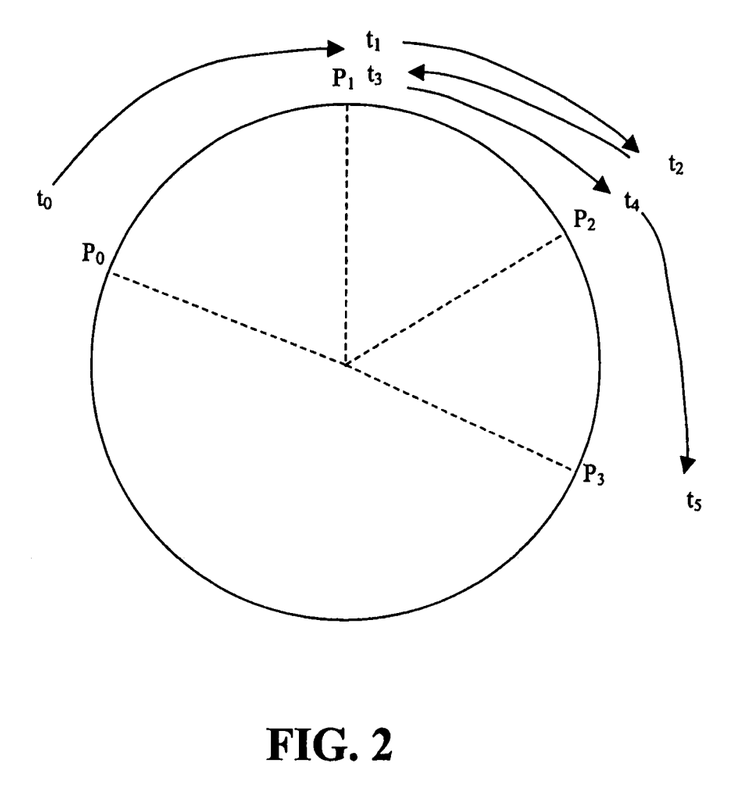
FIG. 2 is an illustration of a device according to an embodiment.
Figure 3:
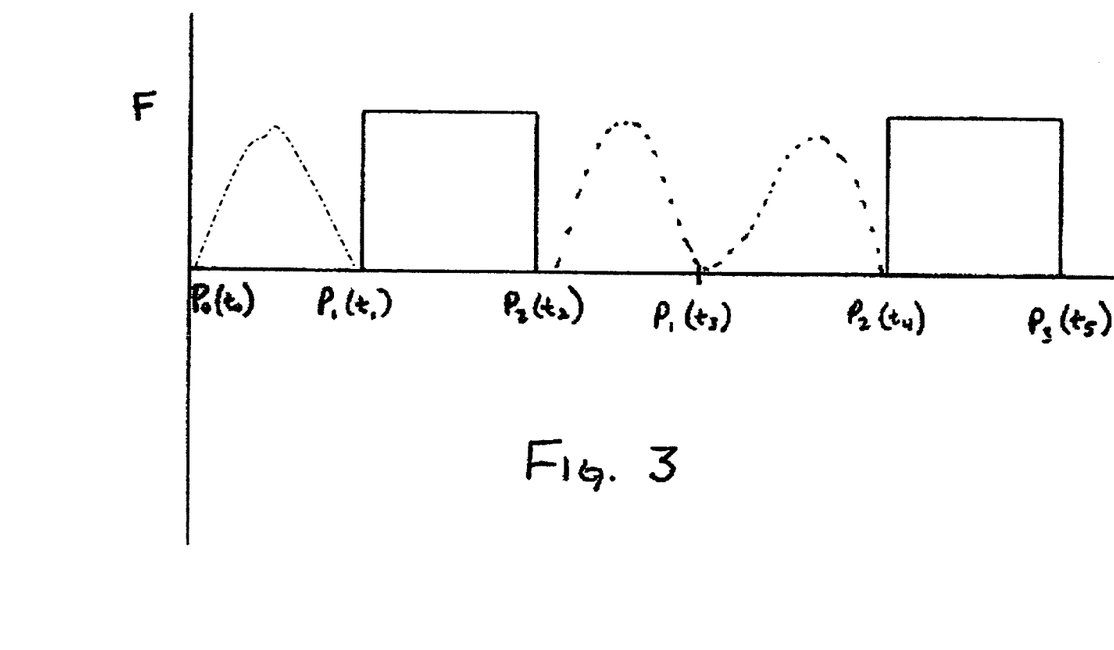
FIG. 3 is an illustration of a force profile associated with a control scheme according to an embodiment.

Referring to FIGS. 2 and 3, a control scheme according to an embodiment includes resetting a boundary of a virtual barrier encountered during movement of an object 200. The forces output can be, for example, simulated spring forces, and can be associated with an event in a graphical environment. For example, the movement of the object 200 may be associated with a movement of a graphical object on a display, such as in a video game. The barrier may include a wall in the same video game that is contacted by the moving graphical object. In the illustrated embodiment, the object 200 is a knob, but any object movable in at least two directions can be used (e.g., a joystick, a mouse, etc). The forces output by the actuators can also be used in other applications, such as a simulated radio tuning knob. When the knob reaches the end of the frequency range of the radio, force is output to simulate reaching the end of the range. In such an embodiment, the "barrier" is the end of the frequency range of the radio. As the knob continues to be turned in that same direction, force will continue to be output. When the knob is turned in the opposite direction, back across the range of radio frequencies, the resistive force is discontinued and the barrier position is reset as discussed above. The force is again output when the knob is turned back towards the end of the frequency range at the point where the knob engages the reset barrier position.

As the object 200 is moved through various positions, the output of the actuator can be modified. The object starts at position $P_0$ at a time $t_0$. As the object 200 is moved in a first direction away from its original position $P_0$ to a second position $P_1$ at time $t_1$, no force is output by the actuator 40. As the object contacts a barrier at the barrier position $P_1$, a resistive force is output by the actuator 40 based on the movement and/or position of the object 200 until the object reaches position $P_2$ at time $t_2$. The force that is output during the movement of the object 200 from position $P_1$ at time $t_1$ to position $P_2$ at time $t_2$ can be a constant resistive force as illustrated in FIG. 3 or a resistive force proportional to the distance of penetration into the virtual barrier (not illustrated).

The haptic feedback is discontinued when the object 200 is moved in the second direction opposite the first direction (i.e., when the object is moved from $P_2$ at time $t_2$ to $P_1$ at time $t_3$.

When the object 200 stops at position $P_1$, position $P_2$ is reset as the position of the barrier. Thus, it is not necessary to move the object 200 back through the previously penetrated distance into the barrier. When the object is moved back in the first direction, from $P_1$ to $P_2$, no force is output until the object reaches the new position of the barrier, $P_2$, at time $t_4$. When the object 200 reaches position $P_2$ at time $t_4$, the resistive force is output until the object reaches position $P_3$. When the object 200 reaches position $P_3$, the force output can be discontinued if the object is moved back in the second direction. Alternatively, the object 200 can continue to be moved in the first direction, thus continuing to output the resistive force.

In an alternative embodiment, haptic feedback can be output when the object 200 is moved in the second direction (e.g., from $P_2$ to $P_1$). The haptic feedback that is output when the object 200 is moved in the second direction can be different than the haptic feedback associated with movement of the object 200 in the first direction. For example, the haptic feedback associated with the movement of the object 200 in the first direction can be a constant resistive force and the haptic feedback associated with the movement of the object 200 in the second direction can be a simulated detent represented by the dashed line in FIG. 3.

In another embodiment, position reset can be accomplished for the output of a detent. For example, when resistive actuators are used to output detent forces, a user will often release the object or manipulandum when the object is positioned off the center of the detent. Without position reset, the first detent output when the object is next engaged is not consistent with other detent outputs because the object did not start in the center of the detent. To provide more consistent initial detent interaction with a resistive actuator, the position of the object is redefined to be the center of the detent after the user has released the object. The release of the object can be detected in various ways. For example, a sensor could be used to detect when contact with the object has ended. Alternatively, the center position can be reset after the object has not been moved for a period of time.

Figure 4:
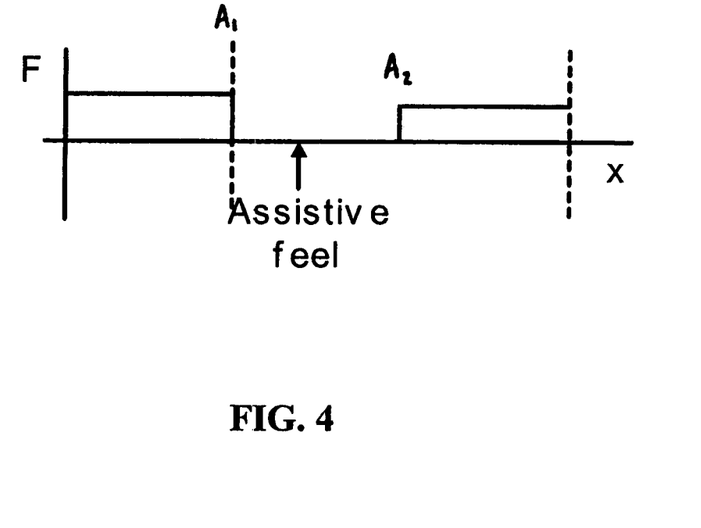
FIG. 4 is an illustration of a force profile associated with a control scheme according to a further embodiment.

Another implementation of a force profile associated with a control scheme according to an embodiment includes using a resistive actuator to create an assistive sensation. Referring to FIG. 4, the resistive actuator can be set to output a given level of force. At some point, such as a predetermined location or orientation $A_1$, or at a predetermined time, the resistive actuator abruptly reduces the amount of force being output to zero, for example, thereby reducing to almost zero the friction on the object. Such an abrupt reduction in the output force provides the sensation of an assistive force. When the object 20 is moved out of the predetermined location or orientation to another location or orientation $A_2$, the resistive force is again output. The locations or orientations $A_1$, $A_2$ can be associated with simulated interactions in a graphical environment or can be time-based.

In another embodiment, control schemes are used in conjunction with a resistive actuator and an active actuator to provide a desired haptic effect, such as a simulated detent. Interface devices that use both assistive and resistive actuators can be referred to herein as "hybrid" interface devices.

Figure 5A:
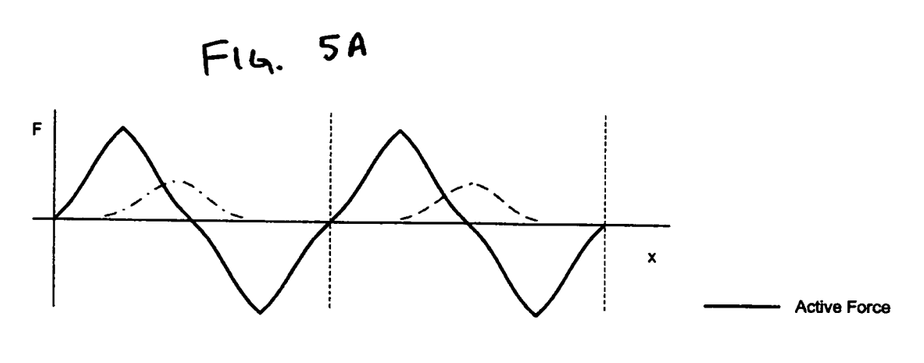
FIG. 5A is an illustration of a force profile associated with a control scheme for a hybrid interface device according to an embodiment.

Examples of force profiles associated with control schemes that can be used with hybrid interface devices to output simulated detent forces are illustrated in FIGS. 5A, 5B, 6A and 6B. Referring first to FIG. 5A, an example of a force profile associated with a control scheme is illustrated in which an assistive force is continuously output by the assistive actuator and is based on the position of the object. At predetermined locations, also based on the position of the object, a resistive force provided by the resistive actuator is superposed on the assistive force. The collective effect from the assistive and resistive forces provides an enhanced detent sensation.

Figure 5B:
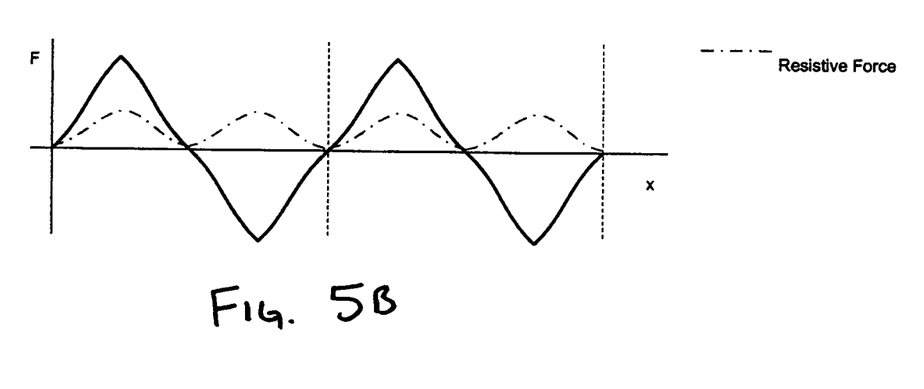
FIG. 5B is an illustration of a force profile associated with a control scheme for a hybrid interface device according to an embodiment.

FIG. 5B illustrates another example of a force profile associated with a control scheme in which both assistive and resistive actuators are used to output a simulated detent force. In the illustrated control scheme, both active and resistive forces are both continuously output based on the position of the object to obtain the desired detent sensation.

Figure 6A:
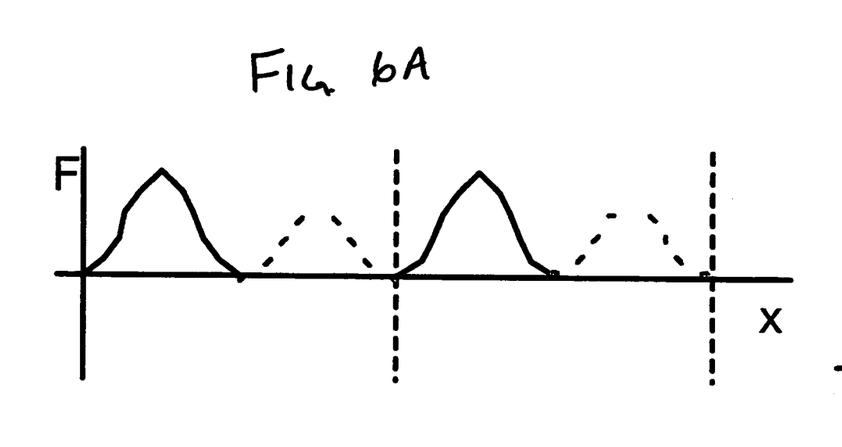
FIG. 6A is an illustration of a force profile associated with a control scheme associated with direction-dependent detents for a hybrid interface device according to an embodiment.
Figure 6B:
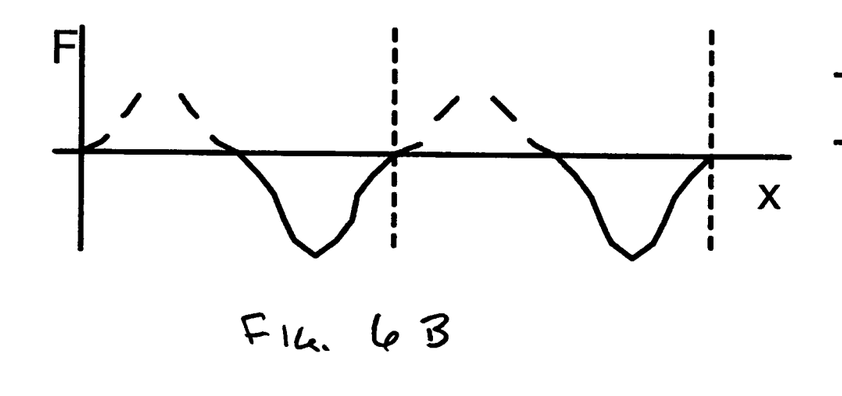
FIG. 6B is an illustration of a force profile associated with a control scheme associated with direction-dependent detents for a hybrid interface device according to another embodiment.

FIGS. 6A and 6B illustrate examples of force profiles associated with control schemes for use with a hybrid device to provide direction-dependent detents. For example, FIG. 6A illustrates an example of a force profile associated with a control scheme in which assistive forces and resistive forces are output in an alternating manner based on the position of the object. For example, as an object is moved from left to right, an assistive force will be applied over a certain distance, followed by a resistive force applied over a distance. FIG. 6B illustrates an example of a control scheme in which assistive forces and resistive forces are output in an alternating manner based on the position of the object. In the illustrated embodiment of FIG. 6B, however, the assistive force is applied in the opposite direction because the object is moved in the opposite direction. For example, as the object is moved from right to left, an assistive force will be applied over a distance in the direction opposite the direction the assistive force applied when the object is moved from left to right, followed by a resistive force applied over a distance.

Hybrid devices have at least one active actuator and at least one resistive actuator coupled to the object 20 to provide different force effects as described above. Both of these actuators have different filtering requirements with respect to the signals generated by the sensor coupled to the object (e.g., position signals, velocity signals, acceleration signals). For the assistive force component of the signal, a balance between the delay and the smoothness of the signal should be achieved. Too much delay in the signal can result in instabilities of the device, while too much noise in the signal can result in unwanted textures that can be perceived by the user. For delay purposes, a velocity signal can be filtered at frequencies of at least approximately 100 Hz, for example.

The filtering requirements for the resistive force component are different from the filtering requirements for the assistive force component. Because the resistive force component of the signals output by the sensor is inherently stable, the filtering can be much more aggressive, resulting in a smoother signal. The velocity signal for the resistive component can be low passed at approximately 10 Hz, for example. Regardless of the particular type of signal and the frequencies at which the two components are filtered, the active component is typically filtered at a higher frequency than the resistive component.

Figure 7:
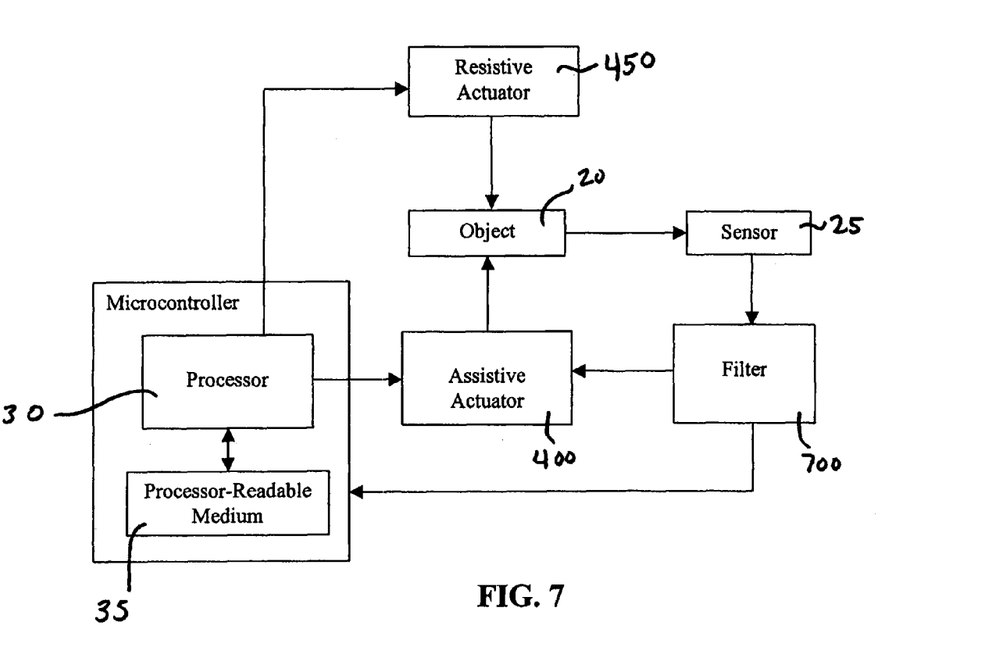
FIG. 7 is a schematic representation of a hybrid interface device according to an embodiment.
Figure 8:
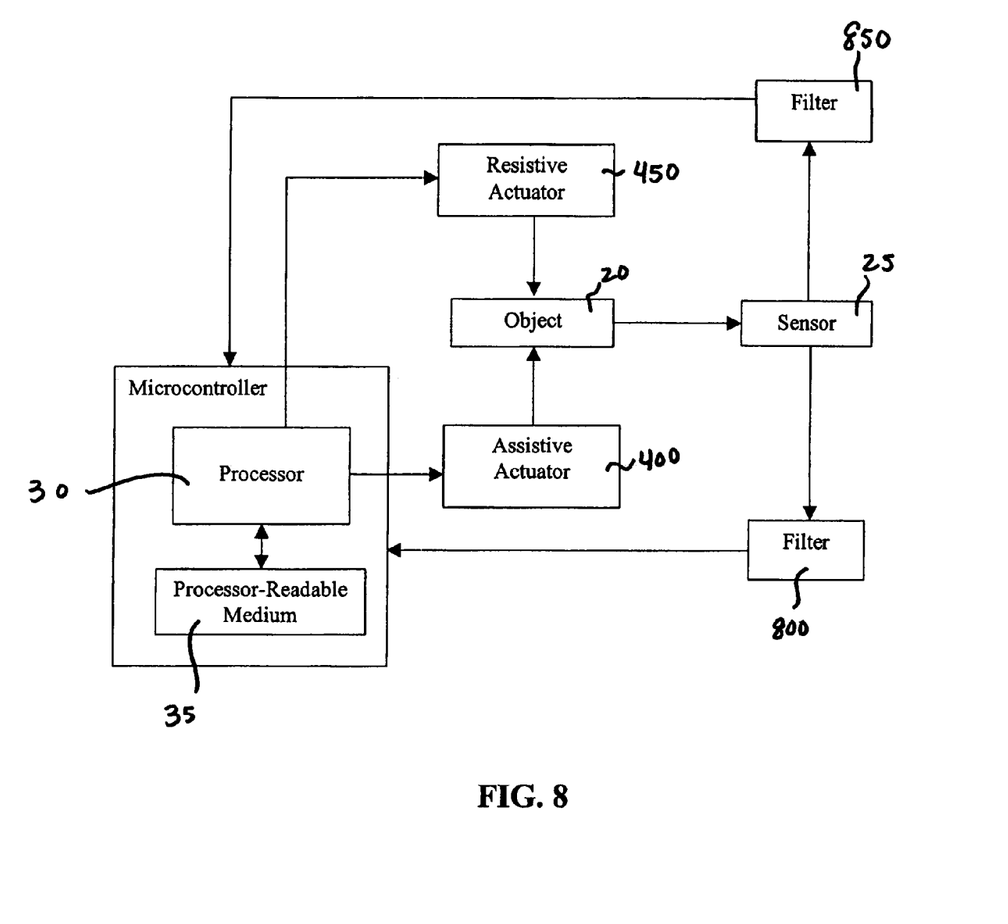
FIG. 8 is a schematic representation of a hybrid interface device according to another embodiment.

The signal filtering can be accomplished using various configurations. For example, referring to FIG. 7, one filter 700 can be used. In such a configuration, the single filter performs different functions depending on whether the signal being filtered is associated with the active actuator 400 or the resistive actuator 450. Alternatively, referring to FIG. 8, two separate filters can be used. One filter 800 is associated with the active actuator 400 and another filter 850 is associated with the passive actuator 450. The different filters 800, 850 perform different functions based on the actuator with which they are associated.

One concern with some embodiments of interface device described herein is that as the interface device 10 is being used, it can become magnetized over time depending on the materials used to construct the interface device 10. As the actuator is repeatedly actuated, the actuator "sticks" because it becomes magnetized. In other words, the resistive actuator doesn't release quickly enough, thereby creating the "stickiness" discussed above. This is due to residual magnetization, which produces a friction level higher than the base line friction in the actuator. To improve the resistive actuator performance, the residual magnetization can be eliminated.

Figure 9A:
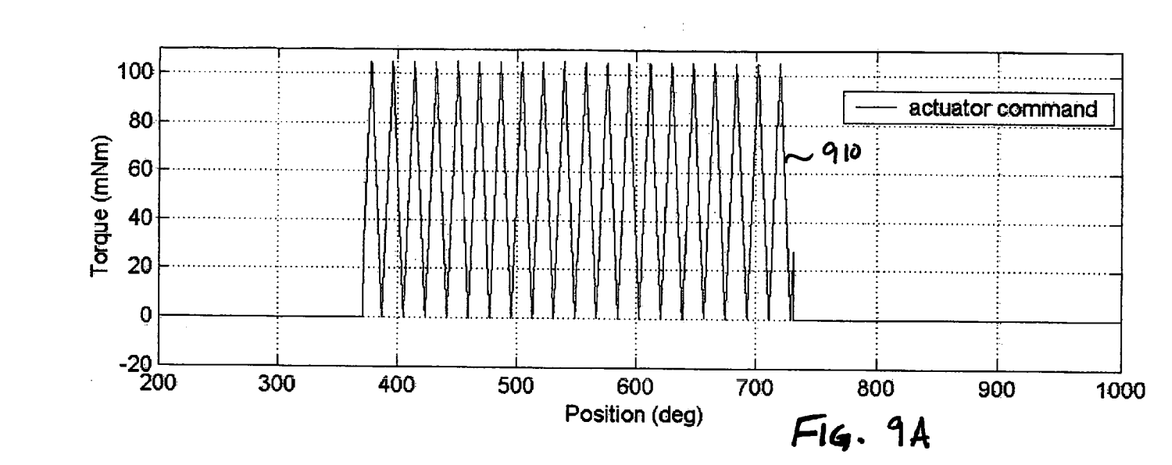
FIG. 9A is an actuator command associated with a force profile of an interface device without demagnetization.
Figure 9B:
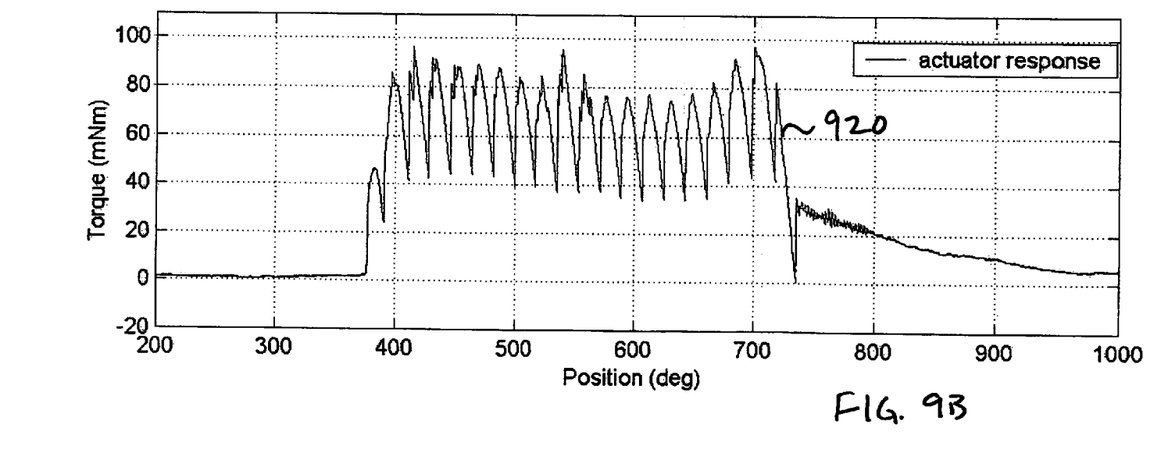
FIG. 9B is the actuator response of the interface device based on the actuator command shown in FIG. 9A.

FIGS. 9A and 9B illustrate the actuator command 910 and actuator response 920 of an interface device without demagnetization, respectively. When the actuator command 910 is set to zero after detents are output, the friction level of the actuator response 920 due to the residual magnetization is higher than the friction before the detents were output as illustrated in FIG. 9B.

Figure 9C:
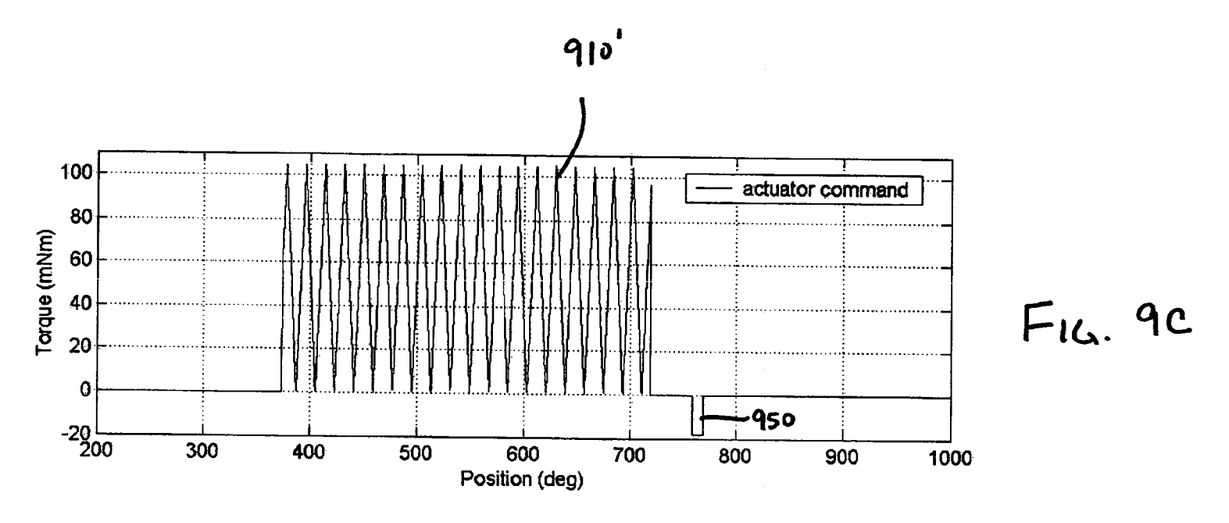
FIG. 9C is an actuator command associated with demagnetization of an interface device according to an embodiment.
Figure 9D:
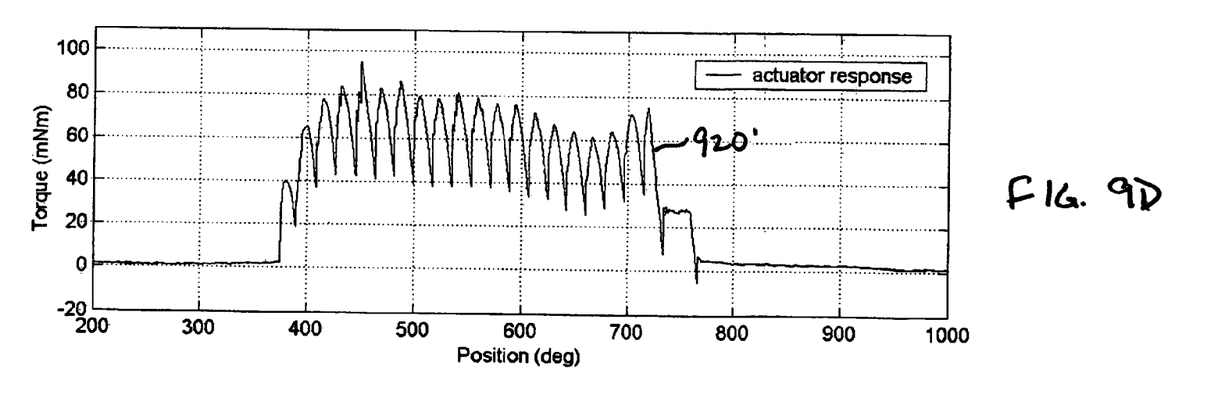
FIG. 9D is the actuator response of the interface device based on the actuator command shown in FIG. 9C, including a demagnetization pulse.

The interface device can be demagnetized by reversing the polarization of the magnetic field for successive simulated detents to demagnetize the interface device (i.e., applying a demagnetization pulse 950). The standard method of demagnetization is to apply a decaying sinusoid pulse. In some embodiments, a single pulse is used to demagnetize the actuator. The demagnetization pulse 950 is a negative pulse of certain size and duration that will improve the demagnetization of the actuator. FIG. 9C illustrates the actuator command 910' including application of the demagnetization pulse 950, and the associated actuator response 920'. Once the demagnetization pulse 950 is applied, the friction in the actuator returns to the level it was at before the detents were output as illustrated in FIG. 9D.

In addition to the polarity of the voltages alternating at each subsequent position, the magnitude of the voltage output may vary with each successive detent. If a given pulse of duration $\Delta_t$ and magnitude $\Delta_m$ demagnetizes the actuator, a pulse of reduced $\Delta_t$ and increased $\Delta_m$ will work as well. The varying magnitude may be based on the position of the object with respect to a reference point or origin position. The magnitude may also vary based on the range of motion through which the object travels.

While various embodiments have been described above, it should be understood that they have been presented by way of example only, and not limitation. Thus, the breadth and scope of the subject matter should not be limited by any of the above-described embodiments, but should be defined only in accordance with the following claims and their equivalence.

The previous description of the embodiments is provided to enable any person skilled in the art to make or use the claimed subject matter. While the subject matter has been particularly shown and described with reference to embodiments thereof, it will be understood by those skilled in art that various changes in form and details may be made therein without departing from the spirit and scope of the inventive subject matter.

For example, the desired effects described herein can be accomplished by any combination of resistive and active actuators. For example, although certain effects are described as being accomplished with an active actuator, the same effect may be accomplished by a resistive actuator or a combination of a resistive actuator and an active actuator (i.e., as in a hybrid interface device).

Although the haptic effect is primarily described as being a simulated detent in some embodiments, in alternative embodiments the output from the interface device can include desired haptic feedback. For example, the haptic feedback can be a vibration, a jolt, a hill, a spring force, a texture, etc.

Although the various force profiles and associated control schemes are primarily disclosed as being based on the position of the object of the device, the various force profiles may also be velocity, acceleration, torque, force, and/or time based.

What is claimed is:

1. A rotatable knob, comprising:
   a sensor configured to sense movement of the rotatable knob to a plurality of positions in a first direction and a second direction opposite the first direction, wherein at least one of the plurality of positions is temporarily associated with a virtual barrier position that indicates that a haptic effect should be output when the rotatable knob is moved to the at least one of the plurality of positions that is temporarily associated with the virtual barrier position;
   an actuator coupled to the rotatable knob, the actuator configured to output a haptic effect; and
   a processor coupled to the sensor and the actuator, the processor configured to:
      temporarily associate a first position with the virtual barrier position;
      receive an indication from the sensor that the rotatable knob was moved in the first direction to the first position when the first position is temporarily associated with the virtual barrier position;
      cause the actuator to output the haptic effect based on the indication and when the first position is temporarily associated with the virtual barrier position;
      reset the virtual barrier position from the first position to a second position different from the first position, wherein the first position is no longer associated with the virtual barrier position after the rest and the second position is associated with the virtual barrier position after the reset; and
      receive an indication from the sensor that the rotatable knob has been moved to the first position after the first position is no longer temporarily associated with the virtual barrier position, wherein the processor no longer causes the actuator to output the haptic effect when the rotatable knob is at the first position and the first position is no longer temporarily associated with the virtual barrier position;
      receive an indication from the sensor that the rotatable knob was moved in the first direction from the second position to a third position different from the first position and the second position; and
      reset the virtual barrier position from the second position to the third position, wherein the first position and the second position are no longer associated with the virtual barrier position after the virtual barrier position is reset from the second position to the third position and the third position is associated with the virtual barrier position after the virtual barrier position is reset from the second position to the third position.

2. The rotatable knob of claim 1, wherein the processor is further configured to:
   receive an indication from the sensor that the rotatable knob has been moved to the first position after the first position is no longer temporarily associated with the virtual barrier position, wherein the processor no longer causes the actuator to output the haptic effect when the rotatable knob is at the first position and the first position is no longer temporarily associated with the virtual barrier position; and
   receive an indication from the sensor that the rotatable knob has been moved to the second position after the second position is no longer temporarily associated with the virtual barrier position, wherein the processor no longer causes the actuator to output the haptic effect when the rotatable knob is at the second position and the second position is no longer associated with the virtual barrier position.

3. The rotatable knob of claim 1, wherein movement of the rotatable knob is associated with movement of a graphical object in a graphical environment, and wherein the virtual barrier position is associated with a barrier in the graphical environment blocking the graphical object.

4. The rotatable knob of claim 1, wherein movement of the rotatable knob is associated with scrolling through a plurality of values, and wherein the virtual barrier position is associated with a particular value.

5. The rotatable knob of claim 4, wherein the plurality of values comprise radio frequencies.

6. The rotatable knob of claim 1, wherein the haptic effect comprises a constant resistive haptic feedback, and wherein the processor is further configured to:
cause the actuator to output the constant resistive haptic feedback as the rotatable knob is moved from the second position to the third position and the actuator outputs the constant resistive haptic feedback until the rotatable knob reaches the third position from the second position.

7. The rotatable knob of claim 6, wherein the processor is further configured to:
reset the virtual barrier position from the second position to the third position based on an indication from the sensor that the rotatable knob moves from the third position to the second position in the second direction opposite the first direction, and wherein the constant resistive haptic feedback is discontinued when the rotatable knob is moved from the third position to the second position.

8. The rotatable knob of claim 1, wherein the haptic effect comprises a constant resistive haptic feedback.

9. The rotatable knob of claim 8, wherein the processor is further configured to:
cause the actuator to output the constant resistive haptic feedback as the rotatable knob is moved from the first position to the second position when the first position is temporarily associated with the virtual barrier position.

10. The rotatable knob of claim 1, wherein the processor is further configured to
reset the virtual barrier position from the first position to the second position based on an indication from the sensor that the rotatable knob was moved from the second position toward the first position in the second direction.

11. The rotatable knob of claim 10, wherein the processor is further configured to:
receive an indication that the rotatable knob was moved back to the second position after the virtual barrier position is reset from the first position to the second position and after the rotatable knob was moved from the second position to the first position; and
cause the actuator to output the haptic effect based on the indication that the rotatable knob was moved back to the second position when the second position is temporarily associated with the virtual barrier position.

12. A method of applying resistive haptic feedback to a rotatable control knob, comprising:
sensing movement of the rotatable knob in a first direction and a second direction, wherein the rotatable knob is moveable to a plurality of positions and at least one of the plurality of positions is temporarily associated with a virtual barrier position that indicates that a haptic effect should be output when the rotatable knob is moved to the at least one of the plurality of positions that is temporarily associated with the virtual barrier position;
temporarily associating a first position with the virtual barrier position;
sensing that the rotatable knob was moved in the first direction to the first position when the first position is temporarily associated with the virtual barrier position;
causing an actuator to output the haptic effect based on sensing movement of the rotatable knob to the first position and when the first position is temporarily associated with the virtual barrier position;
resetting the virtual barrier position from the first position to a second position different from the first position, wherein the first position is no longer associated with the virtual barrier position after the reset;
sensing that the rotatable knob has been moved to the first position after the first position is no longer temporarily associated with the virtual barrier position, and no longer causing the actuator to output the haptic effect when the rotatable knob is at the first position and the first position is no longer temporarily associated with the virtual barrier position;
sensing that the rotatable knob was moved in the first direction from the second position to a third position different from the first position and the second position; and
resetting the virtual barrier position from the second position to the third position, wherein the first position and the second position are no longer associated with the virtual barrier position after the virtual barrier position is reset from the second position to the third position and the third position is associated with the virtual barrier position after the virtual barrier position is reset from the second position to the third position.

13. The method of claim 12, further comprising:
sensing that the rotatable knob has been moved to the first position after the first position is no longer temporarily associated with the virtual barrier position and no longer causing the actuator to output the haptic effect when the rotatable knob is at the first position and the first position is no longer temporarily associated with the virtual barrier position; and
sensing that the rotatable knob has been moved to the second position after the second position is no longer temporarily associated with the virtual barrier position and no longer causing the actuator to output the haptic effect when the rotatable knob is at the second position and the second position is no longer associated with the virtual barrier position.

14. The method of claim 12, wherein movement of the rotatable knob is associated with movement of a graphical object in a graphical environment, and wherein the virtual barrier position is associated with a barrier in the graphical environment blocking the graphical object.

15. The method of claim 12, wherein movement of the rotatable knob is associated with scrolling through a plurality of values, and wherein the virtual barrier position is associated with a particular value.

16. The method of claim 15, wherein the plurality of values comprise radio frequencies.

17. The method of claim 12, wherein the haptic effect comprises a constant resistive haptic feedback, the method further comprising:
causing the constant resistive haptic feedback to be output as the rotatable knob is moved from the second position to the third position and discontinuing the constant resistive haptic feedback when the rotatable knob reaches the third position from the second position.

18. The method of claim 17, wherein resetting the virtual barrier position from the second position to the third position further comprising:
- resetting the virtual barrier position from the second position to the third position based on sensing that the rotatable knob moves from the third position to the second position in the second direction opposite the first direction; and
- discontinuing the constant resistive haptic feedback when the rotatable knob is moved from the third position to the second position.

* * * * *